(12) United States Patent
Xiao

(10) Patent No.: US 11,415,742 B2
(45) Date of Patent: Aug. 16, 2022

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventor: Shiyuan Xiao, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 213 days.

(21) Appl. No.: 16/630,685

(22) PCT Filed: Nov. 12, 2019

(86) PCT No.: PCT/CN2019/117634
§ 371 (c)(1),
(2) Date: Jan. 13, 2020

(87) PCT Pub. No.: WO2021/017285
PCT Pub. Date: Feb. 4, 2021

(65) Prior Publication Data
US 2021/0405283 A1    Dec. 30, 2021

(30) Foreign Application Priority Data

Jul. 29, 2019  (CN) .......................... 201910690895.9

(51) Int. Cl.
*F21V 8/00* (2006.01)

(52) U.S. Cl.
CPC ......... *G02B 6/0088* (2013.01); *G02B 6/0085* (2013.01); *G02B 6/0051* (2013.01); *G02B 6/0073* (2013.01)

(58) Field of Classification Search
CPC .. G02B 6/0088; G02B 6/0085; G02B 6/0051; G02B 6/0073
See application file for complete search history.

(56) References Cited

U.S. PATENT DOCUMENTS

| | | | | |
|---|---|---|---|---|
| 10,197,720 | B2* | 2/2019 | Fan | G02B 6/0068 |
| 10,386,572 | B1* | 8/2019 | Wan | G02B 6/0051 |
| 10,591,665 | B2* | 3/2020 | Li | G02B 6/0038 |
| 2008/0002099 | A1* | 1/2008 | Oh | G02B 6/0091 349/65 |

(Continued)

*Primary Examiner* — Arman B Fallahkhair
(74) *Attorney, Agent, or Firm* — Benesch, Friedlander, Coplan & Aronoff LLP

(57) ABSTRACT

The disclosure provides a backlight module and a display device. The backlight module includes a light guide plate including a light emitting surface, a lateral surface, and a light incident surface disposed correspondingly to the lateral surface. The light emitting surface is connected to the lateral surface and the light incident surface. A light source is disposed correspondingly to the light incident surface and is configured to emit light toward the light incident surface. An optical film is disposed on the light emitting surface. A fixing component is disposed on the light incident surface or the lateral surface and is configured to fasten the optical film on the light emitting surface so that the optical film can be evenly expanded uniformly along a direction parallel to the light source after being heated.

9 Claims, 3 Drawing Sheets

(56) References Cited

U.S. PATENT DOCUMENTS

2014/0009697 A1\* 1/2014 Kuromizu ............ G02B 6/0068
  348/790
2017/0003441 A1\* 1/2017 Choi .................... G02B 6/0091

\* cited by examiner

BACKLIGHT MODULE AND DISPLAY DEVICE

FIELD

The present disclosure relates to the display field and, more particularly, relates to a backlight module and a display device.

BACKGROUND

With development of display panel technology, applications thereof are increasingly broadened as well. Meanwhile, display panels are used in the automobile field in the form of vehicle-mounted display panels.

The vehicle-mounted display panel mainly includes a display panel and a backlight module. As shown in FIG. 1, the backlight module 1 includes a plurality of light sources 11, a light guide plate 12, and an optical film 13. A side of the light guide plate 12 perpendicular to the light sources 11 includes a plurality of steps 14. The optical film 13 is fastened on the light guide plate 12 by the steps 14.

However, when the optical film 13 is thermally expanded, the optical film 13 can only be expanded toward a side of the backlight module 1 opposite to the other side of the backlight module 1 having the steps 14 because the steps 14 limit movement of the optical film 13. Therefore, a distance between the light source 11 at one side and a frame and a distance between the light source 11 at the other side and the other frame are different, which is not beneficial to realizing a narrow bezel display device.

SUMMARY

An objective of the present disclosure is to provide a backlight module and a display device which can realize a narrow bezel display device.

The present disclosure provides a backlight module, including a light source, a light guide, an optical film, and a fixing component.

The light guide plate includes a light emitting surface, a lateral surface, and a light incident surface, wherein the lateral surface and the light incident surface are disposed correspondingly to each other, and the light emitting surface is connected to the lateral surface and the light incident surface.

The light source and the light incident surface of the light guide plate are disposed correspondingly to each other, and the light source is configured to emit light toward the light incident surface of the light guide plate.

The optical film is disposed on the light emitting surface of the light guide plate.

The fixing component is disposed on the light incident surface or the lateral surface of the light guide plate, and the fixing component is configured to fasten the optical film on the light emitting surface of the light guide plate so that the optical film is expanded uniformly along a direction parallel to the light source when heated.

The fixing component includes a plurality of protrusions, and a plurality of notches corresponding to the protrusions are defined in the optical film.

A horizontal distance between the optical film and the light source is greater than a horizontal distance between the light guide plate and the light source when the fixing component is disposed on the lateral surface of the light guide plate.

In one embodiment, an adhesive layer is disposed between the protrusions and the notches.

The adhesive layer includes a light absorbing material when the fixing component is disposed on the light incident surface of the light guide plate.

In one embodiment, the light absorbing material includes black ink.

In one embodiment, the horizontal distance between the optical film and the light source ranges from 0.2 mm to 1 mm when the fixing component is disposed on the lateral surface of the light guide plate.

In one embodiment, a current of the light source ranges from 40 mA to 80 mA when the fixing component is disposed on the light incident surface of the light guide plate.

The present disclosure further provides a backlight module, including a light source, a light guide plate, an optical film, and a fixing component.

The light guide plate includes a light emitting surface, a lateral surface, and a light incident surface, the lateral surface and the light incident surface are disposed correspondingly to each other, and the light emitting surface is connected to the lateral surface and the light incident surface.

The light source and the light incident surface of the light guide plate are disposed correspondingly to each other, and the light source is configured to emit light toward the light incident surface of the light guide plate.

The optical film is disposed on the light emitting surface of the light guide plate.

The fixing component is disposed on the light incident surface or the lateral surface of the light guide plate, and the fixing component is configured to fasten the optical film on the light emitting surface of the light guide plate so that the optical film is expanded uniformly along a direction parallel to the light source when heated.

In one embodiment, the fixing component includes a plurality of protrusions, and a plurality of notches corresponding to the protrusions are defined in the optical film.

In one embodiment, an adhesive layer is disposed between the protrusions and the notches.

The adhesive layer includes a light absorbing material when the fixing component is disposed on the light incident surface of the light guide plate.

In one embodiment, the light absorbing material includes black ink.

In one embodiment, a horizontal distance between the optical film and the light source is greater than a horizontal distance between the light guide plate and the light source when the fixing component is disposed on the lateral surface of the light guide plate.

In one embodiment, the horizontal distance between the optical film and the light source ranges from 0.2 mm to 1 mm when the fixing component is disposed on the lateral surface of the light guide plate.

In one embodiment, a current of the light source ranges from 40 mA to 80 mA when the fixing component is disposed on the light incident surface of the light guide plate.

Furthermore, one embodiment of the present disclosure provides a display device, including a backlight module including a light source, a light guide plate, an optical film, and a fixing component.

The light guide plate includes a light emitting surface, a lateral surface, and a light incident surface, wherein the lateral surface and the light incident surface are disposed correspondingly to each other, and the light emitting surface is connected to the lateral surface and the light incident surface.

The light source and the light incident surface of the light guide plate are disposed correspondingly to each other, and the light source is configured to emit light toward the light incident surface of the light guide plate.

The optical film is disposed on the light emitting surface of the light guide plate.

The fixing component is disposed on the light incident surface or the lateral surface of the light guide plate, and the fixing component is configured to fasten the optical film on the light emitting surface of the light guide plate so that the optical film is expanded uniformly along a direction parallel to the light source when heated.

In one embodiment, the fixing component includes a plurality of protrusions, and a plurality of notches corresponding to the protrusions are defined in the optical film.

In one embodiment, an adhesive layer is disposed between the protrusions and the notches.

The adhesive layer includes a light absorbing material when the fixing component is disposed on the light incident surface of the light guide plate.

In one embodiment, the light absorbing material includes black ink.

In one embodiment, a horizontal distance between the optical film and the light source is greater than a horizontal distance between the light guide plate and the light source when the fixing component is disposed on the lateral surface of the light guide plate.

In one embodiment, the horizontal distance between the optical film and the light source ranges from 0.2 mm to 1 mm when the fixing component is disposed on the lateral surface of the light guide plate.

In one embodiment, a current of the light source ranges from 40 mA to 80 mA when the fixing component is disposed on the light incident surface of the light guide plate.

In the backlight module and the display device provided by the embodiments of the present disclosure, the fixing component is disposed on the light incident surface of the light guide plate or the lateral side, which is disposed correspondingly to the light incident surface, of the light guide plate. As a result, the optical film can be evenly expanded uniformly along a direction parallel to the light source when heated, and a narrow bezel display device can be realized.

To clearly illustrate the above contents of the present disclosure, detailed descriptions are described below in conjunction with embodiments and drawings.

DETAILED DESCRIPTION

Figure 1:
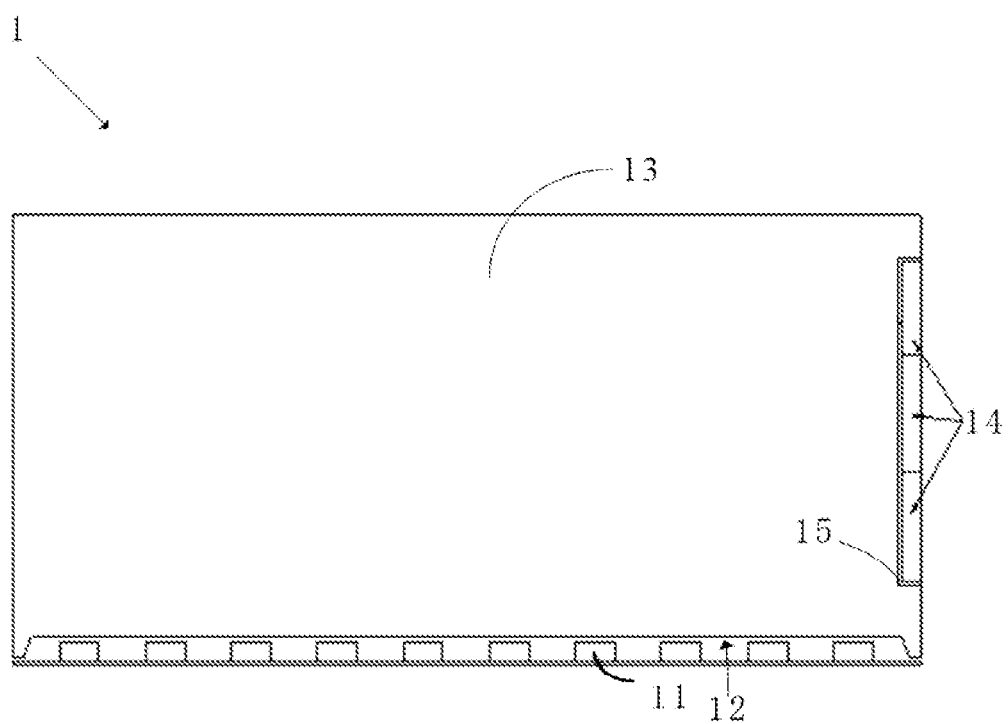
FIG. 1 is a schematic structural view showing a conventional backlight module.

The following description of the various embodiments is provided with reference to the accompanying drawings. It should be understood that terms such as "upper", "lower", "front", "rear", "left", "right", "inside", "outside", "lateral", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In the drawings, the identical or similar reference numerals constantly denote the identical or similar elements or elements having the identical or similar functions.

Specific features, structures, and characteristics which are mentioned in the present disclosure may be included in at least one embodiment. Phrases in the present disclosure are not necessary to refer to the same embodiment and do not refer to an independent embodiment and an alternative embodiment which are exclusive to other embodiments. It should be explicitly and implicitly understood by those skilled in the art that embodiments described in the present disclosure may be combined with other embodiments.

Figure 2:
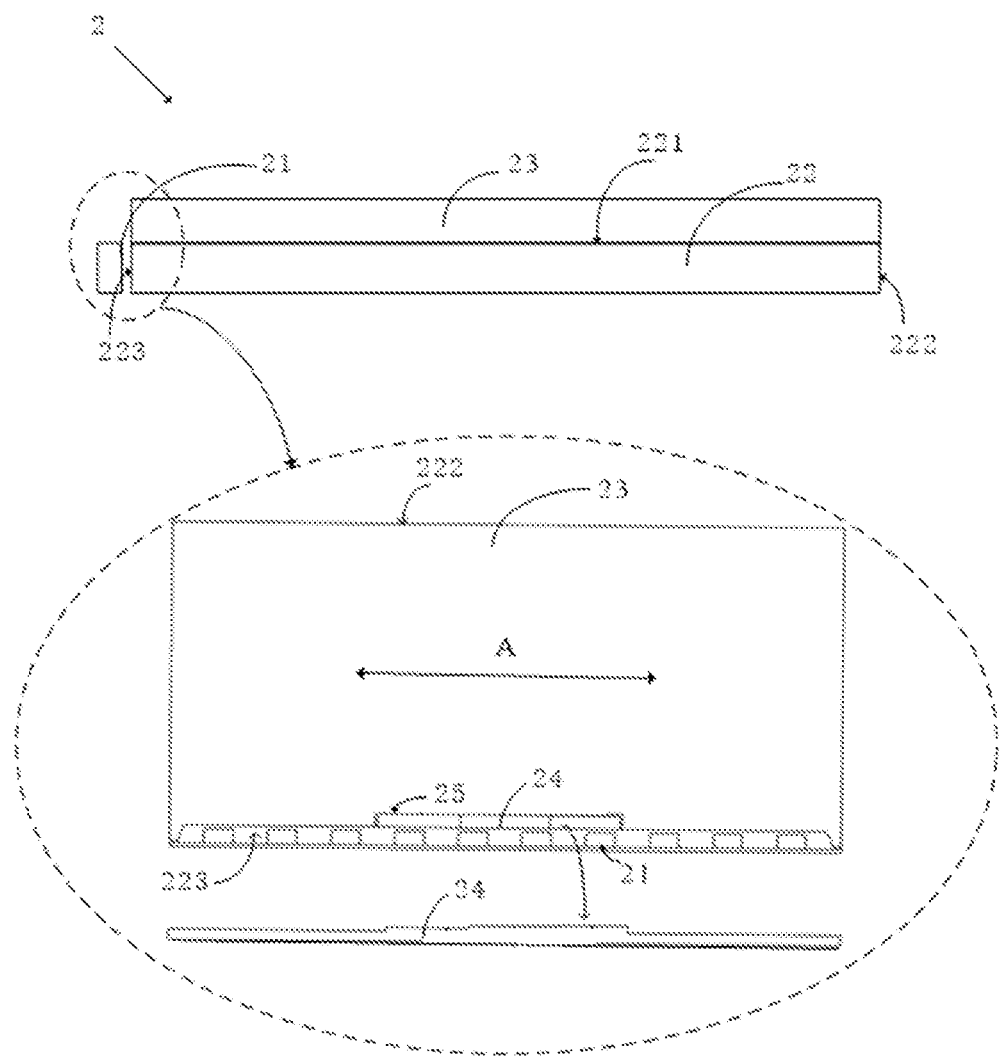
FIG. 2 is a schematic structural view showing a backlight module provided by an embodiment of the present disclosure.

The present disclosure provides a display device including a backlight module as shown in FIG. 2, which is a schematic structural view showing a backlight module provided by an embodiment of the present disclosure. A backlight module 2 includes a light source 21, a light guide plate 22, an optical film 23, and a fixing component 24.

As shown in FIG. 2, The light guide plate 22 includes a light emitting surface 221, a lateral surface 222, and a light incident surface 223. The lateral surface 222 and the light incident surface 223 are disposed correspondingly to each other, and the light emitting surface 221 is connected to the lateral surface 222 and the light incident surface 223.

The light source 21 and the light incident surface 223 of the light guide plate 22 are disposed correspondingly to each other, and the light source 21 is configured to emit light toward the light incident surface 223 of the light guide plate 22. The light source 21 may be a strip light consisting of a plurality of light emitting diodes (LEDs), and each of the LEDs is a point light source. Light emitted from the LEDs enters the light guide plate 22 from the light incident surface 223 and is diffusely reflected by a plurality of printing points inside the light guide plate 22. That is, light is diffused in different directions, wherein a portion of the light is emitted from the light incident surface 221 in the form of surface light.

The optical film 23 is disposed on the light incident surface 221 of the light guide plate 22. The optical film 23 may include a plurality of optical sheets such as a diffusion sheet and a prism sheet. The diffusion sheet is configured to diffuse light, and the prism sheet is configured to increase light brightness.

The fixing component 24 is disposed on the light incident surface 223 of the light guide plate 22 or the lateral surface 222 of the light guide plate 22. The fixing component 24 is configured to fasten the optical film 23 on the light incident surface 221 of the light guide plate 22, as shown in FIG. 2. After the optical film 23 is heated, only an expanding direction of the optical film 23 toward the light source 21 or an expanding direction of the optical film 23 away from the light source 21 will be limited by the fixing component 24, whereas an expanding direction of the optical film 23 parallel to the light source 21 will not be limited. That is, the optical film 23 can be evenly expanded uniformly along a direction A parallel to the light source 21 after being heated. To sum up, distances between the light source 21 and two frames can be even, thereby narrowing a bezel.

In one embodiment, a side of the fixing component 24 may be provided with a bulge, and the light incident surface 223 of the light guide plate 22 and the lateral surface 222 of the light guide plate 22 may be provided with a fixing recess corresponding to the bulge. That is, the fixing component 24 can be selectively fastened on the light incident surface 223 of the light guide plate 22 or the lateral surface 222 of the light guide plate 22 according to practical requirements. In another embodiment, the fixing component 24 may also be integrally formed with the light guide plate 22, that is, the fixing component 24 is directly formed on the light incident surface 223 of the light guide plate 22 or the lateral surface 222 of the light incident surface 223 by a single injection molding process.

As shown in FIG. 2, the fixing component 24 includes a plurality of protrusions, and a plurality of notches 25 corresponding to the protrusions are defined in the optical film 23. In one embodiment, the protrusions are defined on a side of the fixing component 24 opposite to the bulge. Thicknesses of the protrusions may be different. Correspondingly, thicknesses of the notches 25 are decided according to the thicknesses of the protrusions, that is, the thicknesses of the notches 25 may also be different. Furthermore, shapes of the protrusions include, but are not limited to rectangles, rhombi, or circles. Correspondingly, when the shapes of the protrusions are rectangles, the shapes of the notches 25 may be rectangles as well so as to match the protrusions; therefore, the protrusions match the notches 25 so that the protrusions are fixed in the notches 25.

Furthermore, an adhesive layer may be disposed between the protrusions and the notches 25. The adhesive layer is filled between the protrusions and the notches 25 so as to fix them. In one embodiment, when the fixing component 24 is disposed on the light incident surface 223 of the light guide plate 22, the fixing component 24 can prevent the optical film 23 from being expanded toward the light source 21 after the optical film 23 is heated, thereby preventing the light source 21 from being interfered with by the optical film 23. The adhesive layer further includes a light absorbing material which can absorb light leakage from the light guide plate 22. In one embodiment, the light absorbing material includes black ink. Specifically, the adhesive layer may be a stacked structure consisting of a colloid layer, a matrix layer, and a light absorbing layer. The colloid layer is configured to attach the protrusions to the notches 25, the matrix layer is configured to support the light absorbing layer, and the light absorbing layer is configured to absorb leakage of light.

Figure 3:
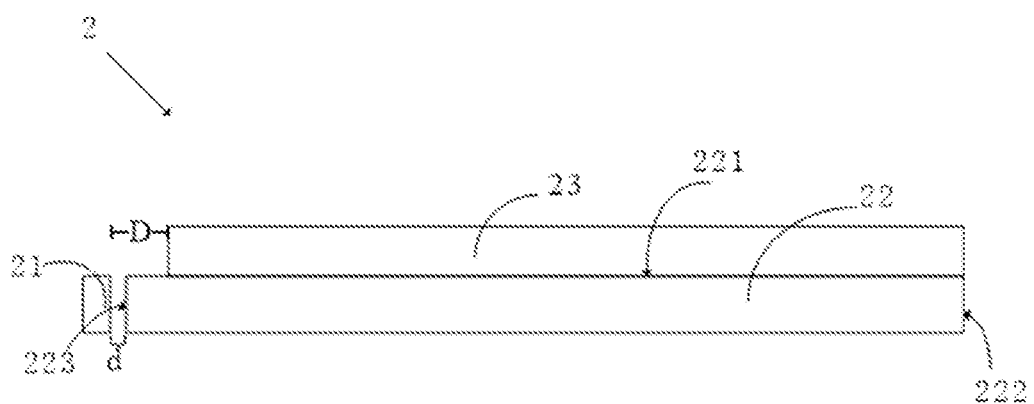
FIG. 3 is another schematic structural view showing a backlight module provided by an embodiment of the present disclosure.

In one embodiment, when the fixing component 24 is disposed on the lateral surface 222 of the light guide plate 22, the optical film 23 will be expanded toward the light source 21 after being heated, thereby interfering with the light source 21. Therefore, as shown in FIG. 3, a horizontal distance D between the optical film 23 and the light source 21 may be designed to be greater than a horizontal distance d between the light guide plate 22 and the light source 21, that is, a safety distance is reserved between the optical film 23 and the light source 21 for the optical film 23 to be expanded. In one embodiment, the horizontal distance D between the optical film 23 and the light source 21 ranges from 0.2 mm to 1 mm.

In one embodiment, when the fixing component 24 is disposed on the light incident surface 223 of the light guide plate 22, a current of the light source 21 can be adjusted to prevent the light source 21 from being interfered with by the optical film 23. Specifically, the current of the light source 21 may be reduced, and the current of the light source 21 ranges from 40 mA to 80 mA.

An embodiment of the present disclosure provides the backlight module and the display device. By disposing the fixing component on the light incident surface of the light guide plate or the lateral surface of the light guide plate, the optical film can be evenly expanded toward the direction parallel to the light source after the optical film is heated, and a narrow bezel display device can be realized.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A backlight module comprising: a light source; a light guide plate; an optical film; and a fixing component; wherein the light guide plate comprises a light emitting surface, a lateral surface, and a light incident surface, the lateral surface and the light incident surface are disposed opposite to each other, and the light emitting surface is connected to the lateral surface and the light incident surface; the light source corresponds to the light incident surface of the light guide plate, and the light source is configured to emit light toward the light incident surface of the light guide plate; the optical film is disposed on the light emitting surface of the light guide plate; wherein the fixing component comprises a plurality of protrusions exclusively on at least one of the light incident surface and the lateral surface of the of the light guide to correspond with a plurality of notches on the optical film, such that the optical film disposed on the light emitting surface of the light guide plate is capable of evenly thermally expanding along a direction parallel to the light incident surface; and wherein a horizontal distance between the optical film and the light source is greater than a horizontal distance between the light guide plate and the light source when the fixing component is disposed on the lateral surface of the light guide plate.

2. The backlight module of claim 1, wherein the horizontal distance between the optical film and the light source ranges from 0.2 mm to 1 mm when the fixing component is disposed on the lateral surface of the light guide plate.

3. The backlight module of claim 1, wherein a current of the light source ranges from 40 mA to 80 mA when the fixing component is disposed on the light incident surface of the light guide plate.

4. A backlight module comprising: a light source; a light guide plate; an optical film; and a fixing component; wherein the light guide plate comprises a light emitting surface, a lateral surface, and a light incident surface, the lateral surface and the light incident surface are disposed opposite to each other, and the light emitting surface is connected to the lateral surface and the light incident surface; the light source corresponds to the light incident surface of the light guide plate, and the light source is configured to emit light toward the light incident surface of the light guide plate; the optical film is disposed on the light emitting surface of the light guide plate; wherein the fixing component comprises a plurality of protrusions exclusively on at least one of the light incident surface and the lateral surface of the of the light guide to correspond with a plurality of notches on the optical film, such that the optical film disposed on the light emitting surface of the light guide plate is capable of evenly thermally expanding along a direction parallel to the light incident surface; and wherein a horizontal distance between the optical film and the light source is greater than a horizontal distance between the light guide plate and the light source when the fixing component is disposed on the lateral surface of the light guide plate.

5. The backlight module of claim 4, wherein a horizontal distance between the optical film and the light source ranges from 0.2 mm to 1 mm when the fixing component is disposed on the lateral surface of the light guide plate.

6. The backlight module of claim 4, wherein a current of the light source ranges from 40 mA to 80 mA when the fixing component is disposed on the light incident surface of the light guide plate.

7. A display device comprising a backlight module comprising a light source, a light guide plate, an optical film, and a fixing component; wherein the light guide plate comprises a light emitting surface, a lateral surface, and a light incident surface, the lateral surface and the light incident surface are disposed opposite to each other, and the light emitting surface is connected to the lateral surface and the light incident surface; the light source corresponds to the light incident surface of the light guide plate, and the light source is configured to emit light toward the light incident surface of the light guide plate; the optical film is totally disposed on the light emitting surface of the light guide plate; wherein the fixing component comprises a plurality of protrusions exclusively on at least one of the light incident surface and the lateral surface of the of the light guide to correspond with a plurality of notches on the optical film, such that the optical film disposed on the light emitting surface of the light guide plate is capable of evenly thermally expanding along a direction parallel to the light incident surface; and wherein a horizontal distance between the optical film and the light source is greater than a horizontal distance between the light guide plate and the light source when the fixing component is disposed on the lateral surface of the light guide plate.

8. The display device of claim 7, wherein a horizontal distance between the optical film and the light source ranges from 0.2 mm to 1 mm when the fixing component is disposed on the lateral surface of the light guide plate.

9. The display device of claim 7, wherein a current of the light source ranges from 40 mA to 80 mA when the fixing component is disposed on the lateral surface of the light guide plate.

* * * * *